United States Patent
Adya et al.

(10) Patent No.: US 8,086,227 B2
(45) Date of Patent: *Dec. 27, 2011

(54) COLLABORATIVELY LOCATING DISCONNECTED CLIENTS AND ROGUE ACCESS POINTS IN A WIRELESS NETWORK

(75) Inventors: Atul Adya, Redmond, WA (US);
Paramvir Bahl, Sammamish, WA (US);
Ranveer Chandra, Kirkland, WA (US);
Lili Qiu, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 685 days.

This patent is subject to a terminal disclaimer.

(21) Appl. No.: 11/940,466

(22) Filed: Nov. 15, 2007

(65) Prior Publication Data

US 2008/0070563 A1    Mar. 20, 2008

Related U.S. Application Data

(63) Continuation of application No. 11/047,022, filed on Jan. 31, 2005, now Pat. No. 7,317,914.

(60) Provisional application No. 60/613,055, filed on Sep. 24, 2004.

(51) Int. Cl.
*H04M 11/00* (2006.01)
(52) U.S. Cl. ............ 455/421; 455/456.1; 455/456.2; 455/436; 455/67.11; 702/150
(58) Field of Classification Search .......... 455/456.2, 455/67.11, 456.1, 421, 436; 702/150
See application file for complete search history.

(56) References Cited

U.S. PATENT DOCUMENTS

| | | |
|---|---|---|
| 5,729,680 A | 3/1998 | Belanger et al. |
| 6,282,577 B1 | 8/2001 | Okanoue et al. |
| 6,338,087 B1 | 1/2002 | Okanoue |
| 6,370,146 B1 | 4/2002 | Higgins et al. |
| 6,522,888 B1 | 2/2003 | Garceran et al. |
| 6,643,465 B1 | 11/2003 | Bösinger et al. |
| 6,664,925 B1 | 12/2003 | Moore et al. |
| 6,721,305 B1 | 4/2004 | Chan et al. |
| 6,799,047 B1 | 9/2004 | Bahl et al. |
| 6,839,560 B1 | 1/2005 | Bahl et al. |

(Continued)

FOREIGN PATENT DOCUMENTS

JP    8-204709    8/1996

(Continued)

OTHER PUBLICATIONS

European Search Report from European Application No. 05 108 256.8.

(Continued)

*Primary Examiner* — Dwayne Bost
*Assistant Examiner* — Amancio Gonzalez
(74) *Attorney, Agent, or Firm* — Wolf, Greenfield & Sacks, P.C.

(57) ABSTRACT

Methods are described for using collaboration of neighboring wireless devices to enable location of disconnected wireless devices and rogue wireless access points. A central server computes the locations of the neighboring clients and uses those locations to estimate the location of a disconnected client. These techniques may take advantage of the beaconing and probing mechanisms of IEEE 802.11 to ensure that connected clients do not pay unnecessary overheads for detecting disconnected clients. Methods are also described for detecting and locating rogue devices by collaboratively collecting information from neighboring devices and comparing the information to a database.

5 Claims, 6 Drawing Sheets

U.S. PATENT DOCUMENTS

| | | | |
|---|---|---|---|
| 6,857,012 | B2 | 2/2005 | Sim et al. |
| 6,957,069 | B2 * | 10/2005 | Shah et al. ............... 455/436 |
| 6,990,428 | B1 | 1/2006 | Kaiser et al. |
| 6,992,625 | B1 | 1/2006 | Krumm et al. |
| 7,006,434 | B1 | 2/2006 | Klein et al. |
| 7,020,475 | B2 | 3/2006 | Bahl et al. |
| 7,042,391 | B2 | 5/2006 | Meunier et al. |
| 7,047,287 | B2 | 5/2006 | Sim et al. |
| 7,068,599 | B1 | 6/2006 | Jiang et al. |
| 7,127,258 | B2 | 10/2006 | Zegelin |
| 7,133,909 | B2 | 11/2006 | Bahl |
| 7,159,026 | B2 | 1/2007 | Lau et al. |
| 7,184,421 | B1 | 2/2007 | Liu et al. |
| 7,209,751 | B2 * | 4/2007 | Nishida et al. ............ 455/456.1 |
| 7,233,286 | B2 | 6/2007 | Krumm et al. |
| 7,242,947 | B2 * | 7/2007 | Niu et al. ................... 455/456.1 |
| 7,251,685 | B1 | 7/2007 | Yildiz |
| 7,317,914 | B2 * | 1/2008 | Adya et al. ................. 455/421 |
| 7,339,914 | B2 | 3/2008 | Bhagwat et al. |
| 2001/0022615 | A1 | 9/2001 | Fernandez et al. |
| 2002/0025795 | A1 | 2/2002 | Sharon et al. |
| 2003/0037155 | A1 | 2/2003 | Lee |
| 2003/0118015 | A1 | 6/2003 | Gunnarsson et al. |
| 2003/0217130 | A1 | 11/2003 | Tang et al. |
| 2003/0217289 | A1 | 11/2003 | Ammon et al. |
| 2003/0224797 | A1 | 12/2003 | Kuan et al. |
| 2003/0229696 | A1 | 12/2003 | Klein et al. |
| 2004/0049565 | A1 | 3/2004 | Keller et al. |
| 2004/0054766 | A1 | 3/2004 | Vicente |
| 2004/0185845 | A1 | 9/2004 | Abhishek et al. |
| 2005/0027858 | A1 | 2/2005 | Sloth et al. |
| 2005/0063317 | A1 | 3/2005 | Risberg et al. |
| 2005/0135236 | A1 | 6/2005 | Benson et al. |
| 2006/0046709 | A1 | 3/2006 | Krumm et al. |
| 2006/0068769 | A1 | 3/2006 | Adya et al. |
| 2006/0077946 | A1 | 4/2006 | Adya et al. |

FOREIGN PATENT DOCUMENTS

| | | |
|---|---|---|
| JP | 2000-115230 | 4/2000 |
| JP | 2000-196593 | 7/2000 |
| JP | 2001-45038 | 2/2001 |
| JP | 2003-186761 | 7/2003 |
| JP | 2006-538228 | 5/2005 |
| JP | 2005-176386 | 6/2005 |
| WO | WO 01/58098 A2 | 8/2001 |
| WO | WO 02/13560 A1 | 2/2002 |
| WO | WO 03/044986 A1 | 5/2003 |
| WO | WO 03/083601 A2 | 10/2003 |
| WO | WO 2004/068786 A1 | 8/2004 |
| WO | WO 2005/046254 A2 | 5/2005 |

OTHER PUBLICATIONS

Aboba, B. and Simon, D. PPP EAP TLS Authentication Protocol. In *RFC 2716*, Oct. 1999.

Adya, A., Bahl, P., Chandra, R., and Qiu, L. Architecture and techniques for diagnosing faults in IEEE 802.11 infrastructure networks. In *Proc. of ACM Conference on Mobile computing and networking*, 2004.

Airdefense. Wireless LAN Security. Downloaded from http://airdefense.net. Jan. 24, 2005.

Airmagnet. AirMagnet Distributed System. Downloaded from http://airmagnet.com. Jan. 24, 2005.

Airtight Networks. SpectraMon. Downloaded from http://www.airtightnetworks.com. Jan. 24, 2005.

Airwave. AirWave Management Platform. Downloaded from http://airwave.com. Jan. 24, 2005.

Allman, M., Eddy, W. and Ostermann, S. Estimating Loss Rates With TCP. In *ACM Perf. Evaluation Review 31*(3), Dec. 2003.

Atheros Communications. Downloaded from http://www.atheros.com. Jan. 24, 2005.

Awerbuch, B., Holmer, D. and Rubens, H. Provably Secure Competitive Routing against Proactive Byzantine Adversaries via Reinforcement Learning. In *JHU Tech Report Version 1*, May 2003.

Bahl, P. and Padmanabhan, V. N. Radar: An Inbuilding RF-based User Location and Tracking System. In *Proc. of IEEE INFOCOM*, Tel-Aviv, Israel, Mar. 2000.

Barford, P. and Crovella, M. Critical Path Analysis of TCP Transactions. In *Proc. of ACM SIGCOMM*, Stockholm, Sweden, Aug. 2000.

Bellardo, J. and Savage, S. Measuring Packet Reordering. In *Proc. of ACM Internet Measurement Workshop*, Marseille, France, Nov. 2002.

Bluetooth Sig. Location Working Group. http://bluetooth.org.

Buchegger, S. and Le Boudec, J. The Effect of Rumor Spreading in Reputation Systems for Mobile Ad-Hoc Networks. In *Proc. of WiOpt*, France, Mar. 2003.

Chandra, R., Bahl, R. P. and Bahl, P. MultiNet: Connecting to Multiple IEEE 802.11 Networks Using a Single Wireless Card. In Proc. of IEEE INFOCOM, Hong Kong, Mar. 2004.

Cisco. Cisco Works Wireless LAN Solution Engine. Downloaded from http://cisco.com. Jan. 24, 2005.

Computer Associates. Unicenter Solutions: Enabling a Successful Wireless Enterprise. Downloaded from http://www3.ca.com/Files/WhitePapers/22996-enabling_a_successful.pdf. Jan. 24, 2005.

Ethereal: A Network Protocol Analyzer. Downloaded from http://ethereal.com. Jan. 24, 2005.

Floyd, S., Handley, M., Padhye, J., and Widmer, J. Equation-Based Congestion Control for Unicast Applications. In Proc. of ACM SIGCOMM, Stockholm, Sweden, Aug. 2000.

Foley, J. D., van Dam, A., Feiner, S. K., and Hughes, J. F. *Computer Graphics Principles and Practice (2nd Edition)*. Addison Wesley, 1990.

IBM Research. Wireless Security Auditor (WSA). Downloaded from http://www.research.ibm.com/gsal/wsa. Jan. 24, 2005.

IEEE Computer Society. IEEE 802.1x-2001 IEEE Standards for Local and Metropolitan Area Networks: Port-Based Network Access Control, 1999.

IEEE Computer Society. Wireless LAN Medium Access Control (MAC) and Physical Layer (PHY) Specifications. *IEEE Standard 802.11*, 1999.

Ladd, A., Bekris, K., Rudys, A., Marceau, G., Kavraki, L., and Wallach, D. Robotics-Based Location Sensing using Wireless Ethernet. In *Proc. of ACM MobiCom*, Atlanta, GA, Sep. 2002.

Mahajan, R., Spring, N., Wetherall, D., and Anderson, T. User-level Internet Path Diagnosis. In *Proc. of ACM SOSP*, Bolton Landing,. NY, Oct. 2003.

Marti, S., Giuli, T., Lai, K., and Baker, M. Mitigating Routing Misbehavior in Mobile Ad Hoc Networks. In Proc. of ACM MobiCom, Boston, MA, Aug. 2000.

Microsoft Corp. Native 802.11 Framework for IEEE 802.11 Networks. Downloaded from http://microsoft.com. Jan. 24, 2005.

Neuman, B. and Tso, T. An Authentication Service for Computer Networks. In IEEE Communications, Karlsruhe, Germany, Sep. 1994.

Padhye, J., Firoiu, V., Towsley, D., and Kurose, J. Modeling TCP Throughput: a Simple Model and its Empirical Validation. In Proc. of ACM SIGCOMM, Vancouver, BC, Sep. 1998.

Priyantha, N. B., Chakraborty, A. and Balakrishnan, H. The Cricket Location-Support System. In Proc. of ACM MobiCom, Boston, MA, Aug. 2000.

Qiu, L., Bahl, P., Rao, A., and Zhou, L. Fault Detection, Isolation, and Diagnosis in Multihop Wireless Networks. Technical Report MSR-TR-2004-11, Microsoft Research, Redmond, WA, Dec. 2003.

Raya, M., Hubaux, J. P., and I. Aad. Domino: A System to Detect Greedy Behavior in IEEE 802.11 Hotspots. In *Proc. of MobiSys*, Boston, MA, Jun. 2004.

Rigney, C., Rubens, A., Simpson, W., and Willens, S. Remote Authentication Dial in User Service (RADIUS). In *RFC 2138, IETF*, Apr. 1997.

Schulzrinne, H., Casner, S., Frederick, R. and Jacobson, V. RTP: A Transport Protocol for Real-Time Applications. In *RFC 1889, IETF*, Jan. 1996.

Stevens, R. *TCP/IP Illustrated (vol. 1): The Protocols*. Addison Wesley, 1994.

Symbol Technolgies Inc. Spectrum.Soft: Wireless Network Management System. http://www.symbol.com.

Want, R., Hopper, A., Falcao, V. and Gibbons, J. The Active Badge Location System. ACM Transactions on Information Systems, 10(1), Jan. 1992.

WildPackets Inc. Airopeek Wireless LAN Analyzer. Downloaded from http://www.wildpackets.com. Jan. 24, 2005.

WinDump: tcpdump for Windows. Downloaded from http://windump.polito.it. Jan. 24, 2005.

Zhang, Y., Breslau, L., Paxson, V. and Shenker, S. On the Characteristics and Origins of Internet Flow Rates. In Proc. of ACM SIGCOMM, Pitsburgh, PA, Aug. 2002.

Zhang, Y., Duffield, N., Paxson, V., and Shenker, S. On the Constancy of Internet Path Properties. In Proc. of ACM Internet Measurement Workshop, San Francisco, CA, Nov. 2001.

Partial Search Report dated Jun. 10, 2010 from European Application No. 05108255.0.

Partial Search Report dated Jun. 15, 2010 from European Application No. 05108254.3.

Extended Search Report dated Oct. 12, 2010 from European Application No. 05108254.3.

Extended Search Report dated Oct. 12, 2010 from European Application No. 05108255.0.

* cited by examiner

COLLABORATIVELY LOCATING DISCONNECTED CLIENTS AND ROGUE ACCESS POINTS IN A WIRELESS NETWORK

CROSS-REFERENCE TO RELATED APPLICATIONS

This application is a continuation of U.S. application Ser. No. 11/047,022, filed Jan. 31, 2005, and entitled "Collaboratively Locating Disconnected Clients And Rogue Access Points In A Wireless Network", which claims the benefit of U.S. Provisional Patent Application No. 60/613,055 entitled, "System And Method For Diagnosing Faults In Wireless Networks," filed on Sep. 24, 2004. Each of these applications is hereby incorporated by reference in its entirety.

The present application is also related to co-pending application Ser. No. 11/047,189, entitled "Detecting And Diagnosing Performance Problems In A Wireless Network Through Neighbor Collaboration," and 11/047,190 entitled "Using A Connected Wireless Computer As A Conduit For A Disconnected Wireless Computer," both filed on Jan. 31, 2005. Each of these applications is hereby incorporated by reference in its entirety.

FIELD OF THE INVENTION

This invention relates generally to network operations, and more particularly, to locating disconnected or unauthorized devices in wireless networks.

BACKGROUND OF THE INVENTION

The convenience of wireless networking has led to a widescale adoption of wireless networks (e.g., IEEE 802.11 networks). Corporations, universities, homes, and public places are deploying these networks at a remarkable rate. However, a significant number of "pain points" remain for end-users and network administrators. Users experience a number of problems such as intermittent connectivity, poor performance, lack of coverage, and authentication failures. These problems occur due to a variety of reasons such as poor access point layout, device misconfiguration, hardware and software errors, the nature of the wireless medium (e.g., interference, propagation), and traffic congestion. Users frequently complain about connectivity and performance problems, and network administrators are expected to diagnose these problems while managing corporate security and coverage. Their task is particularly difficult due to the unreliable nature of the wireless medium and a lack of intelligent diagnostic tools for determining the cause of these problems.

For companies with a large deployment of IEEE 802.11 networks, there may be several thousand Access Points (APs) spread over many buildings. Problems with the networks result in end-user frustration and loss of productivity for the corporation. Furthermore, resolution of each end-user complaint results in additional support personnel costs to a company's IT department; this cost can be several tens of dollars and this does not include the cost due to the loss of end-user productivity.

Fault diagnostics in IEEE 802.11 infrastructure networks has not garnered attention from the research community relative to other higher profile areas of research in wireless networking. Several companies attempt to offer diagnostic tools, but these products lack a number of desirable features. For example, they do not do a comprehensive job of gathering and analyzing the data to establish the possible causes of a problem. Furthermore, most products typically only gather data from the APs and neglect the client-side view of the network. Some products that monitor the network from the client's perspective require hardware sensors, which can be expensive to deploy and maintain. Also, current solutions do not typically provide any support for disconnected clients, even though these are the ones that need the most help.

BRIEF SUMMARY OF THE INVENTION

The problems outlined above may at least in part be addressed by a system and method for detecting and diagnosing faults in wireless networks as described herein.

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

In one embodiment, the monitoring architecture described herein is used for locating client machines that have become disconnected from a wireless network. In another embodiment, the architecture is used for detecting rogue or unauthorized access points in enterprise wireless networks.

In one embodiment, a computer-readable medium including computer-executable instructions is provided for determining the location of a disconnected wireless computing device, the wireless computing device being disconnected from an infrastructure network, the computer-executable instructions executing on one or more connected wireless computing devices in the vicinity of the disconnected device, and performing the steps of receiving one or more beacon signals from the disconnected device, recording signal strength information about the disconnected device according to the beacon signals, informing a diagnostic server that the disconnected device is not connected to the infrastructure network, and transmitting the signal strength information to the diagnostic server for estimating the location of the disconnected device, wherein the beacon signals are sent by the disconnected device in response to a determination that the device is not connected to the infrastructure network.

In another embodiment, a computer-readable medium including computer-executable instructions is provided for determining the location of a disconnected wireless computing device, the wireless computing device being disconnected from an infrastructure network and in the vicinity of one or more wireless devices being connected to the infrastructure network, the computer-executable instructions executing on a server, and performing the steps of receiving signal strength information about the disconnected device from the one or more connected devices, computing estimates of the locations of the one or more connected devices; and approximating the location of the disconnected device using the computed estimates and the received signal strength information.

In still another embodiment, a method is provided for identifying a rogue wireless access point in an infrastructure network, method comprising the steps of receiving information about a suspicious access point, the information collected by one or more nearby wireless computing devices or access points, comparing the information with an access point database, and identifying the suspicious access point as rogue if the information is inconsistent with the access point database.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
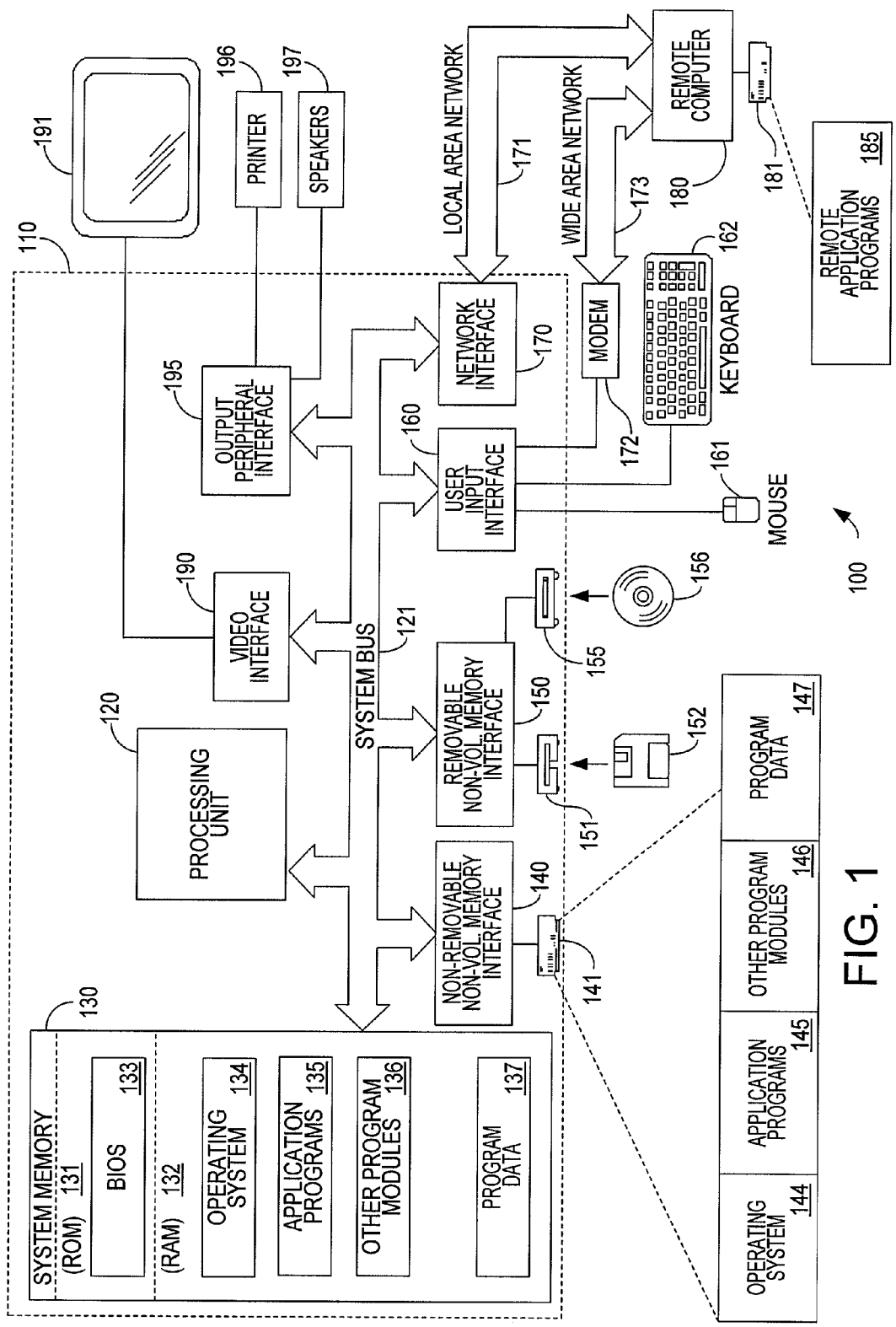
FIG. 1 is a simplified schematic illustrating an exemplary architecture of a computing, as used in accordance with an embodiment of the invention.

The methods and systems to locate disconnected clients and detect rogue access points will now be described with respect to preferred embodiments; however, the methods and systems of the present invention are not so limited. Moreover, the skilled artisan will readily appreciate that the methods and systems described herein are merely exemplary and that variations can be made without departing from the spirit and scope of the invention. After reviewing this description, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

Listed below are many of the problems that users and network administrators face when using and maintaining corporate wireless networks.

Connectivity problems: End-users complain about inconsistent or a lack of network connectivity in certain areas of a building. Such "dead spots" or "RF holes" can occur due to a weak RF signal, lack of a signal, changing environmental conditions, or obstructions. Locating an RF hole automatically is critical for wireless administrators; they can then resolve the problem by either relocating APs or increasing the density of APs in the problem area or by adjusting the power settings on nearby APs for better coverage.

Performance problems: This category includes all the situations where a client observes degraded performance, e.g., low throughput or high latency. There could be a number of reasons why the performance problem exists, e.g., traffic slow-down due to congestion, RF interference due to a microwave oven or cordless phone, multi-path interference, large co-channel interference due to poor network planning, or due to a poorly configured client/AP. Performance problems can also occur as a result of problems in the non-wireless part of the network, e.g., due to a slow server or proxy. It is therefore useful for the diagnostic tool to be able to determine whether the problem is in the wireless network or elsewhere. Furthermore, identifying the cause in the wireless part is important for allowing network administrators to better provision the system and improve the experience for end-users.

Network security: Large enterprises often use solutions such as IEEE 802.1x to secure their networks. However, a nightmare scenario for IT managers occurs when employees unknowingly compromise the security of the network by connecting an unauthorized AP to an Ethernet tap of the corporate network. The problem is commonly referred to as the "Rogue AP Problem". These Rogue APs are one of the most common and serious breaches of wireless network security. Due to the presence of such APs, external users are allowed access to resources on the corporate network; these users can leak information or cause other damage. Furthermore, Rogue APs can cause interference with other access points in the vicinity. Detecting Rogue APs in a large network via a manual process is expensive and time consuming; thus, it is important to detect such APs proactively.

Authentication problems: According to the IT support group's logs, a number of complaints are related to users' inability to authenticate themselves to the network. In wireless networks secured by technologies such as IEEE 802.1x, authentication failures are typically due to missing or expired certificates. Thus, detecting such authentication problems and helping clients to bootstrap with valid certificates is important. The present invention will be more completely understood through the following detailed description, which should be read in conjunction with the attached drawings. In this description, like numbers refer to similar elements within various embodiments of the present invention. Aspects of the invention are illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. In particular, the computer 110 preferably contains a wireless networking interface or wireless card, operating according to an IEEE 802.11 protocol.

Figure 2:
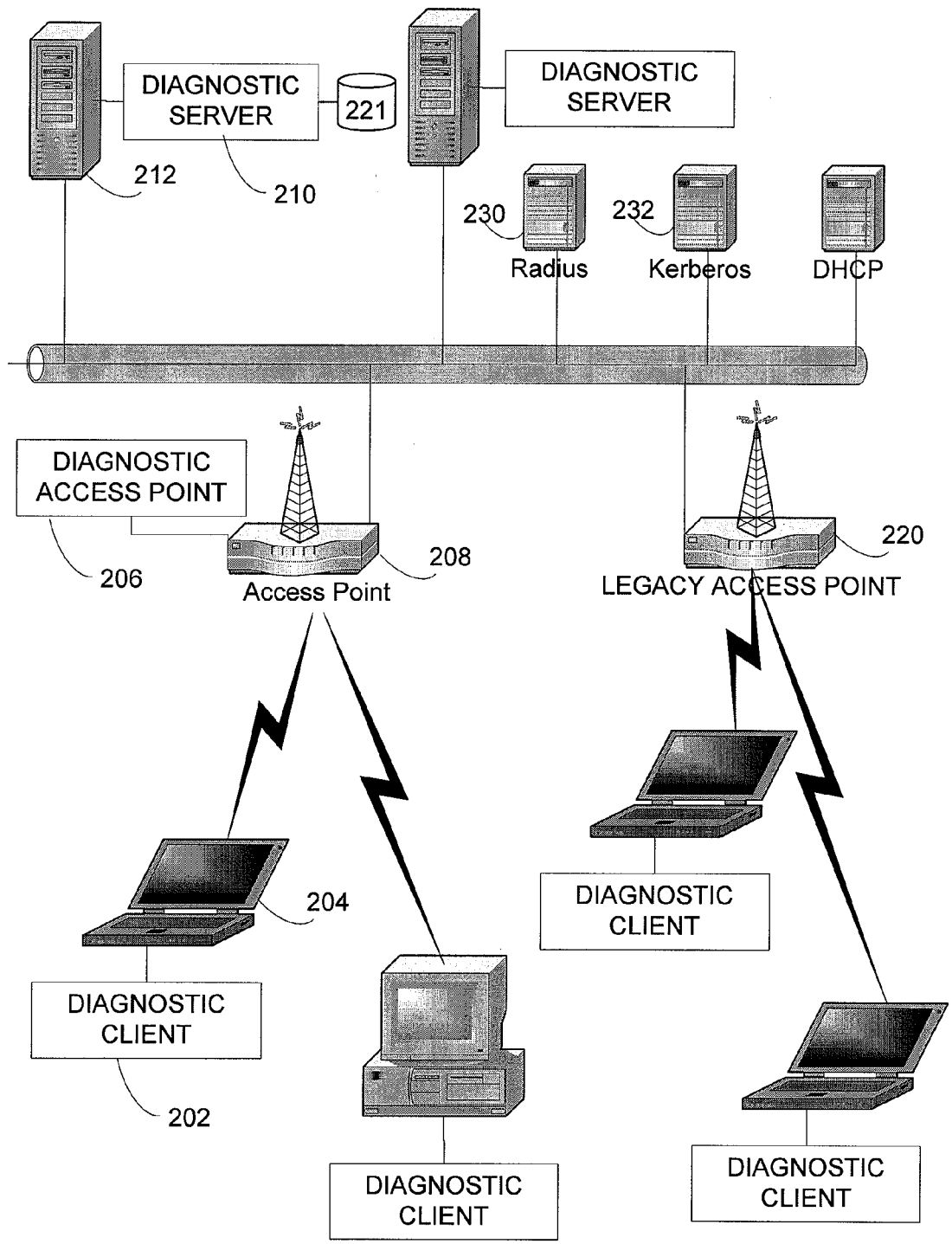
FIG. 2 is a diagram illustrating an exemplary wireless network for locating disconnected clients and rogue access points, in accordance with an embodiment of the invention.

In an embodiment of the invention, a system consists of several components, as illustrated in FIG. 2. A Diagnostic Client (DC) 202 is software that runs on a wireless client machine 204. A Diagnostic AP (DAP) 206 runs on an Access Point 208. A Diagnostic Server (DS) 210 runs on a backend server 212 of the organization.

In some embodiments of the invention, the Diagnostic Client module 202 monitors the RF environment and the traffic flow from neighboring clients 214 and APs 216. During normal activity, the client's wireless card is not placed in promiscuous mode. The DC 202 uses the collected data to perform local fault diagnosis. Depending on the individual fault-detection mechanism, a summary of this data is transmitted to the DAPs 206 or DSs 210 at preferably regular intervals. In addition, the DC 202 is programmed to accept commands from the DAP 206 or the DS 210 to perform on-demand data gathering, e.g., switching to promiscuous mode and analyzing a nearby client's performance problems. In case the wireless client 204 becomes disconnected, the DC 202 logs data to a local database/file. This data can be analyzed by the DAP 206 or DS 210 at some future time when network connectivity is resumed.

The Diagnostic AP 206 accepts diagnostic messages from DCs 202, merges them along with its own measurements and sends a summary report to the DS 210. Some embodiments of the invention do not include the Diagnostic AP 206. The DAP 206 offloads work from the DS 210. Some embodiments of the invention include a mixture of legacy APs 220 and DAPs 206: if an AP is a legacy AP 220, its monitoring functions are performed by the DCs 202 and its summarizing functions and checks are performed at the DS 210.

The Diagnostic Server 210 accepts data from DCs 202 and DAPs 206 and performs the appropriate analysis to detect and diagnose different faults. The DS 210 also has access to a database 221 that stores each AP's 208 location. Network administrators can deploy multiple DSs 210 in the system to balance the load, for example, by hashing each AP's MAC address to a particular DS 210. In some embodiments, the Diagnostic Server 210 interacts with other network servers, such as a RADIUS 230 and Kerberos 232 servers, to get client authorization and user information.

The exemplary system described with reference to FIG. 2 supports both reactive and proactive monitoring. In proactive monitoring, DCs and DAPs monitor the system continuously: if an anomaly is detected by a DC, DAP, or DS, an alarm is raised for a network administrator to investigate. The reactive monitoring mode is used when a support personnel wants to diagnose a user complaint. The personnel can issue a directive to a particular DC from one of the DSes to collect and analyze the data for diagnosing the problem.

The exemplary system imposes negligible overheads with respect to power management. Both the proactive and reactive techniques described later consume very little bandwidth, CPU, or disk resources; as a result, they have negligible impact on battery consumption. The exemplary system architecture shown in FIG. 2 supports several functions in embodiments of the invention by using the DCs, DAPs and DSes. Some of the supported functions include: locating disconnected clients; helping disconnected clients; isolating performance problems; and detecting rogue access points.

In some embodiments of the invention, the DAP 206 is a software modification on AP 208, allowing for better scalability and for analyzing an AP's performance. Since no hardware modifications are necessary, the bar for deploying this embodiment is lower.

The client machines 204 and access points 208 preferably have the ability to control beacons and probes. Additionally, client machines 204 preferably have the capability of starting an infrastructure network (i.e., becoming an AP) or an ad hoc network (i.e., computer-to-computer) on their own; this ability is supported by many wireless cards currently available in the marketplace. Some embodiments of the invention make use the presence of nearby clients or access points. By taking advantage of nearby clients and access points instrumented with software "sensors", deployment costs are potentially lowered.

The backend server 212 preferably uses a database to maintain the location of all the access points in the network. Such location databases are preferably maintained by network administrators.

The exemplary system illustrated in FIG. 2 can scale with the number of clients and APs in the system. The system contains two shared resources: DSs and DAPs. To prevent a single Diagnostic Server from becoming a potential bottleneck, additional DSs are preferably added as the system load increases. Furthermore, some embodiments allow each individual DS to offload work by sharing the diagnosis burden with the DCs and the DAPs; the DS is used only when the DCs and DAPs are unable to diagnose the problem and the analysis requires a global perspective and additional data (e.g., signal strength information obtained from multiple DAPs may be needed for locating a disconnected client).

Similarly, since the DAP is a shared resource, making it do extra work can potentially hurt the performance of all its associated clients. To reduce the load on a DAP, some embodiments of the invention use an optimization technique, whereby an AP does not perform active scanning if any client is associated with it; the associated clients perform these operations as needed. The AP continues to perform passive monitoring activities that have a negligible effect on its performance. If there is no client associated, the AP is idle and it can perform these monitoring operations. This approach ensures that most of the physical area around the AP is monitored without hurting the AP's performance.

In one embodiment, the interactions between the DC, DAP, and DS are secured using EAP-TLS certificates issued over IEEE 802.1x. An authorized certification authority (CA) issues certificates to DCs, DAPs and DSs; these certificates are used to ensure that all communication between these entities is mutually authenticated. One embodiment includes known techniques for detecting malicious behavior by legitimate users.

Figure 3:
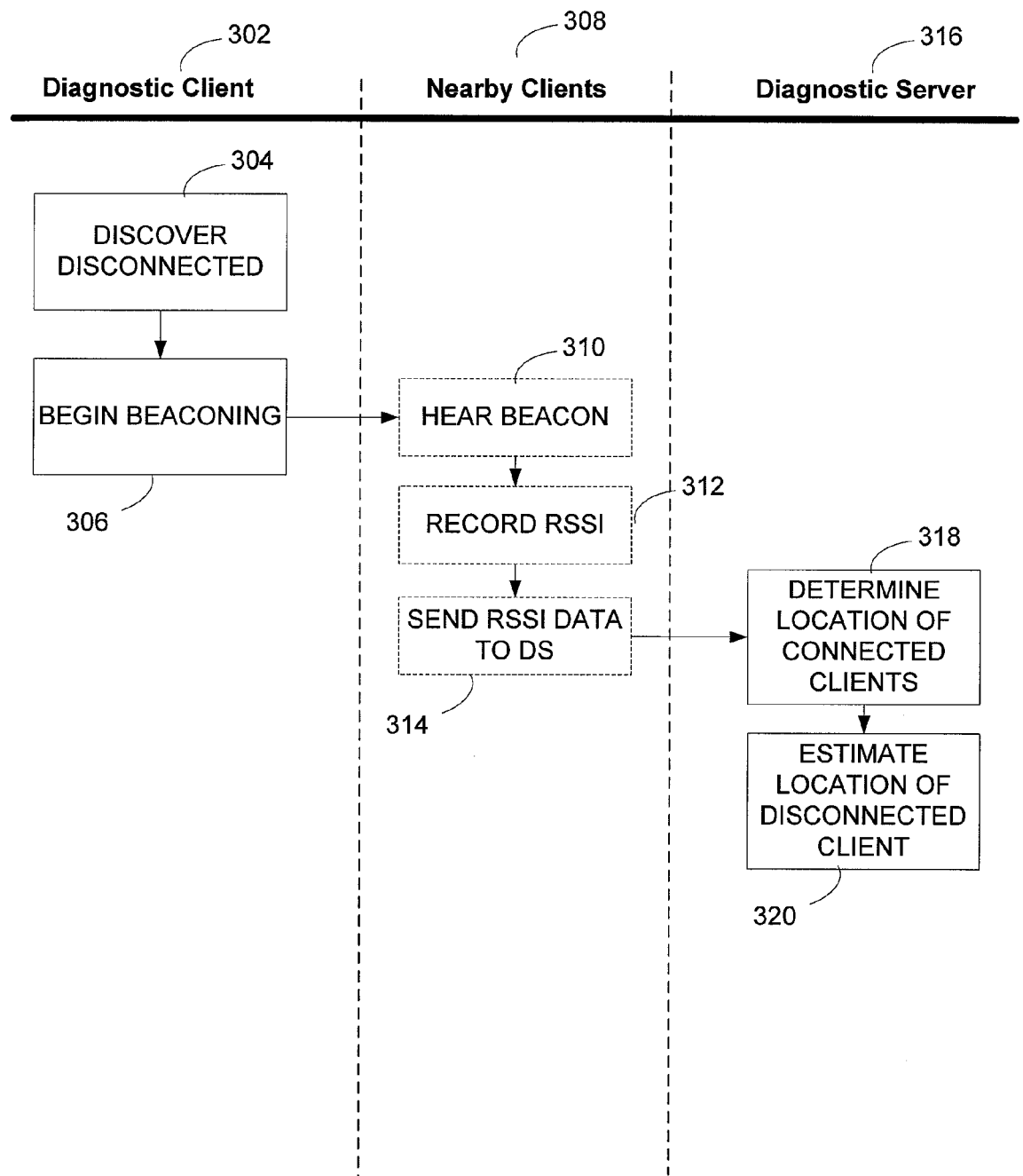
FIG. 3 is a flow diagram illustrating a method for locating disconnected clients, in accordance with an embodiment of the invention.

The ability to locate disconnected wireless clients automatically in a fault diagnosis system is potentially useful for proactively determining problematic regions in a deployment, e.g., poor coverage or high interference (locating RF holes) or for locating possibly faulty APs. In embodiments of the invention, a disconnected client determines that it is in an RF hole if it does not hear beacons from any AP (as opposed to being disconnected due to some other reason such as authentication failures). To approximately locate disconnected clients (and hence help in locating RF holes), embodiments use a technique called Double Indirection for Approximating Location or DIAL, described with reference to FIG. 3.

When a client 302 discovers that it is disconnected at step 304, it becomes an AP or starts an ad hoc network and starts beaconing at step 306. To determine the approximate location of this client, nearby connected clients 308 hear the client's 302 beacons at step 310 and record the signal strength (RSSI) of these packets at step 312. At step 314, they inform the DS 316 that client 302 is disconnected and send the collected RSSI data. The DS 316 then, at step 318, executes the first step of DIAL to determine the location of the connected clients: this can be done using any known location-determination technique in the literature, such as those described by P. Bahl and V. N. Padmanabhan in "RADAR: An Inbuilding RF-based User Location and Tracking System," in *Proc. of IEEE INFOCOM*, Tel-Aviv, Israel, March 2000, and by A. Ladd et al. in "Robotics-Based Location Sensing using Wireless Ethernet," in *Proc. of ACM MobiCom*, Atlanta, Ga., September 2002, which are hereby incorporated by reference in their entirety for all that they teach without exclusion of any part thereof. At step 320, the DS 316 uses the locations of the connected clients as "anchor points" and the disconnected client's RSSI data to estimate its approximate location. This step is preferably performed using any scheme that uses RSSI values from multiple clients for determining a machine's location, such as those described in the references above or by any other known method. Since locating the connected clients results in some error, consequently locating disconnected clients with these anchor points can further increase the error. However, it has been empirically shown that this error is approximately 10 to 12 meters which is acceptable for estimating the location of disconnected clients.

Figure 4:
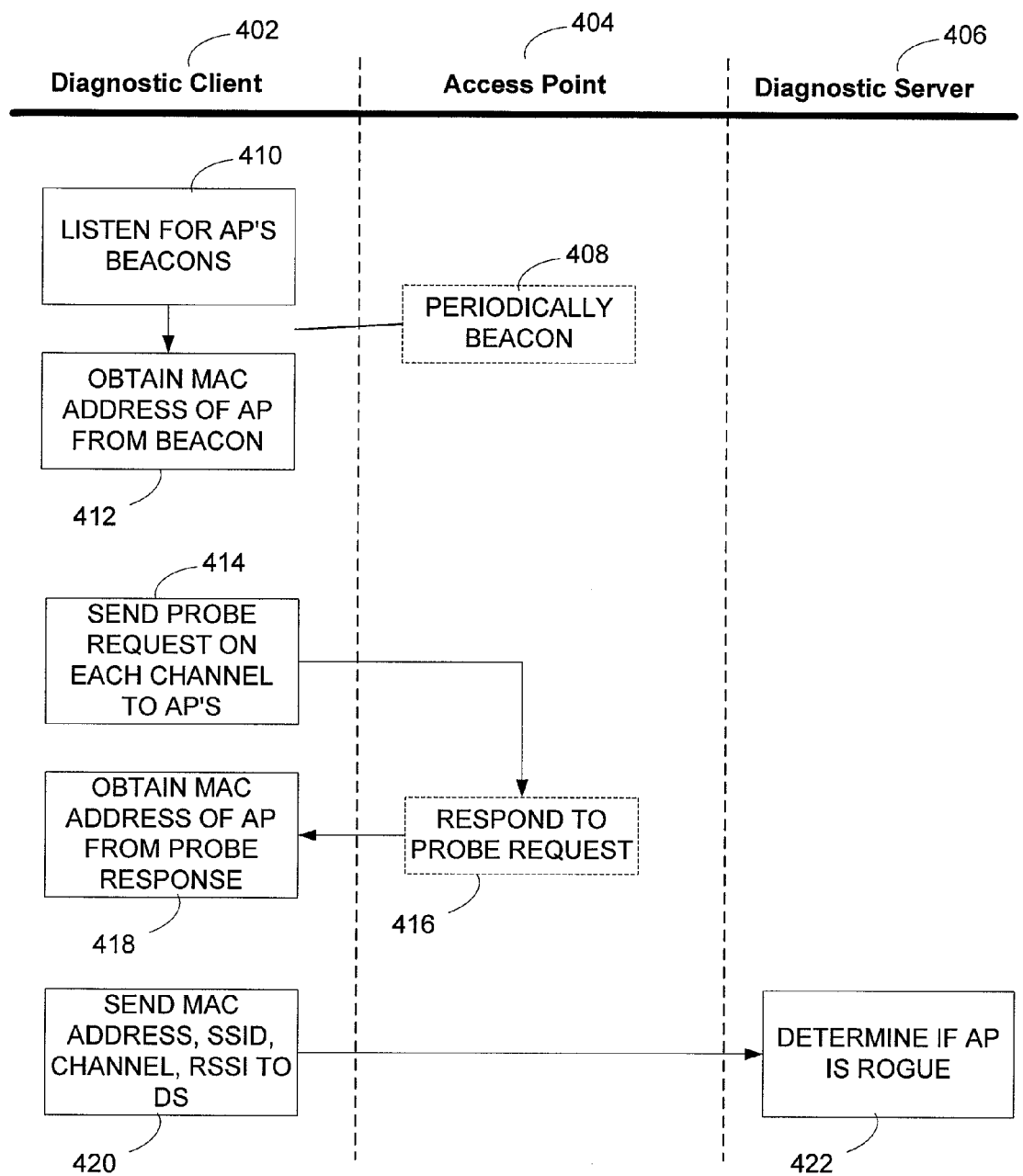
FIG. 4 is a flow diagram illustrating a method for collaboratively obtaining information on access points in a wireless network, in accordance with an embodiment of the invention.

Turning to FIG. 4, a method of detecting rogue APs is discussed, in accordance with an embodiment of the invention. Rogue APs are unauthorized APs that have been connected to an Ethernet tap in an enterprise or university network; such APs can result in security holes, and unwanted RF and network load. Rogue APs are considered a major security issue for enterprise wireless LANs. By using clients and (if possible) APs to monitor the environment around them, embodiments of the invention detect rogue APs. The approach is to make clients and DAPs collect information about nearby access points and send it to the DS. When the DS receives information about an AP X, it checks an AP location database and ensures that X is a registered AP in the expected location and channel. The approach detects rogue APs using off-the-shelf IEEE 802.11-compliant hardware. This suffices to function as a low-cost mechanism that addresses the common case Rogue AP problem being faced in current deployments: for many networks administrators, the main goal is to detect APs inadvertently installed by employees for experimentation or convenience. Other embodiments may implement detection of non-compliant Rogue access points and clients as well. If two companies have neighboring wireless networks, the other companies' access points are preferably detected as Rogue APs. If this classification is unacceptable, the network administrators of the respective companies can share their AP location databases.

Each DC 402 monitors the packets in its vicinity (in a nonpromiscuous mode), and for each AP 404 that it detects, it sends a 4-tuple <MAC address, SSID, channel, RSSI> to the DS 406. Essentially, the 4-tuple uniquely identifies an AP in a particular location and channel. To get this information, a DC 402 determines the MAC addresses of all APs 404 around it.

The DC 402 can obtain the MAC address of an AP 404 by switching to promiscuous mode and observing data packets (it can use the FromDS and ToDS bits in the packet to determine which address belongs to the AP). However, the same effect is preferably achieved using the following approach: since IEEE 802.11 requires all APs to broadcast beacons at regular intervals at step 408, the DC 402 listens for the beacons at step 410 and obtains the MAC addresses from the APs' 404 beacons from all the APs that it can hear at step 412. It has been shown that a DC 402 not only hears beacons on its channel but it may also hear beacons from overlapping channels as well; this property increases the likelihood of a Rogue AP being detected.

To ensure that a Rogue AP does not go undetected, even if no client is present on any channel overlapping with the AP, embodiments use the Active Scanning mechanism of the IEEE 802.11 protocol: when a client 402 (for example, a diagnostic client running on a wireless computer or on an access point) wants to find out what APs 404 are nearby, the client 402 goes to each of the 11 channels (in 802.11b), and sends Probe Requests at step 414. The client 402 waits for Probe Responses to be sent from all APs at step 416 that hear those Probe Requests; from these responses, the DC obtains the APs' 404 MAC addresses at step 418. Every IEEE 802.11-compliant AP must respond to such requests; in some chipsets, no controls are provided to disable this functionality. A Busy AP Optimization is preferably used so that active scans in an AP's vicinity are performed by an AP only when it has no client associated with it. In embodiments of the invention, Active Scanning is preferably performed on demand, for example, at the request of a network administrator as communicated through diagnostic clients and diagnostic access points. Alternatively, Active Scanning is performed regularly on a periodic basis or according to a policy set by a network administrator.

Once the client 402 has collected AP information, it sends the 4-tuples to the DS 406 at step 420. The DS 406 then determines whether the AP is a rogue AP at step 422, described in more detail below.

Figure 5:
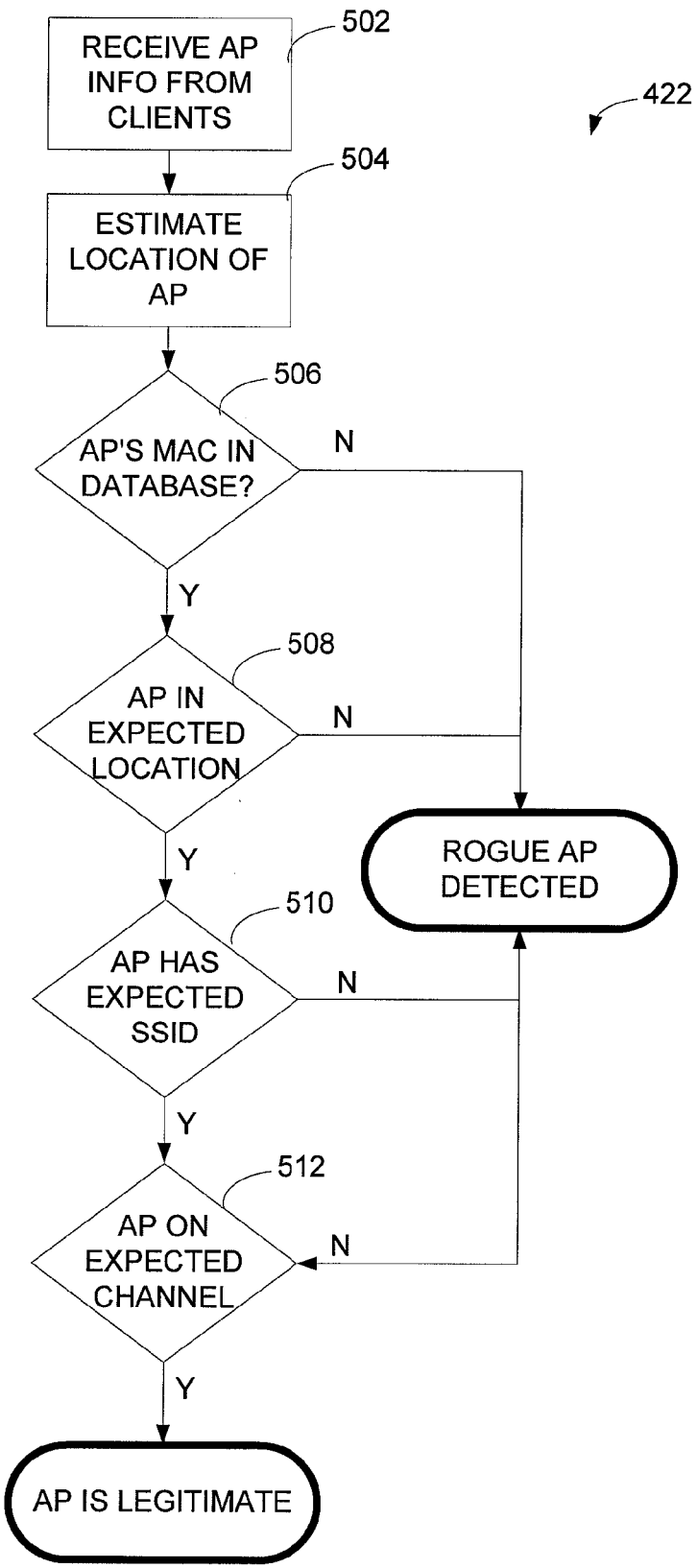
FIG. 5 is a flow diagram illustrating a method for determining if an access point is rogue, in accordance with an embodiment of the invention.

Turning to FIG. 5, when the DS receives information for an AP from various clients at step 502, it uses DIAL to estimate the AP's approximate location based on these clients' locations and the AP's RSSI values from them at step 504, using methods such as those described above with reference to FIG. 3. The DS classifies an AP as rogue if a 4-tuple does not correspond to a known legal AP in the DS's AP location database at step 506, i.e., if the MAC address is not present in the database, or if the AP is not in the expected location at step 508, or the SSID does not correspond to the expected SSID(s) in the organization at step 510. In some embodiments, if an AP's SSID corresponds to an SOS SSID, the DS skips further analysis since this AP may actually correspond to a disconnected client that is executing a connection setup phase of a Client Conduit protocol, as described in co-pending application entitled "USING A CONNECTED WIRELESS COMPUTER AS A CONDUIT FOR A DISCONNECTED WIRELESS COMPUTER" by Adya, et al., filed Jan. 31, 2005. The channel information is used in a slightly different way. As stated above, if an AP is on a certain channel, it is possible to be heard on overlapping channels. Thus, an AP is classified as rogue at step 512 only if it is reported on a channel that does not overlap with the one on which it is expected. If the channel on an AP is changed, the DAP preferably asks the DS to update its AP location database (recall that the communication between the DAP and the DS is authenticated; if the AP is a legacy AP, the administrator can update the AP location database when the AP's channel is changed).

A Rogue AP R might try to use MAC address spoofing to avoid being detected, i.e., send packets using the MAC address corresponding to a real AP G. However, the DS in embodiments of the invention still detects R since R will reside in a different location or channel than G (if it is on the same channel and location, G immediately detects it). Note that a Rogue AP is detected even if it does not broadcast the SSID in its beacons since a DC can still obtain the AP's MAC address from the beacon. Such unauthorized APs are alternatively detected by disallowing APs that do not broadcast SSIDs in an enterprise LAN.

In embodiments of the invention, an unauthorized AP may stay undetected for a short time by spoofing an existing AP X near X's location, beacon a valid SSID in the organization, and stay on a channel on which no DC or AP can overhear its beacons. However, when a nearby client performs an active scan, the Rogue AP will be detected. To detect such rogue APs, a DC preferably performs such a scan every 5 minutes.

Figure 6:
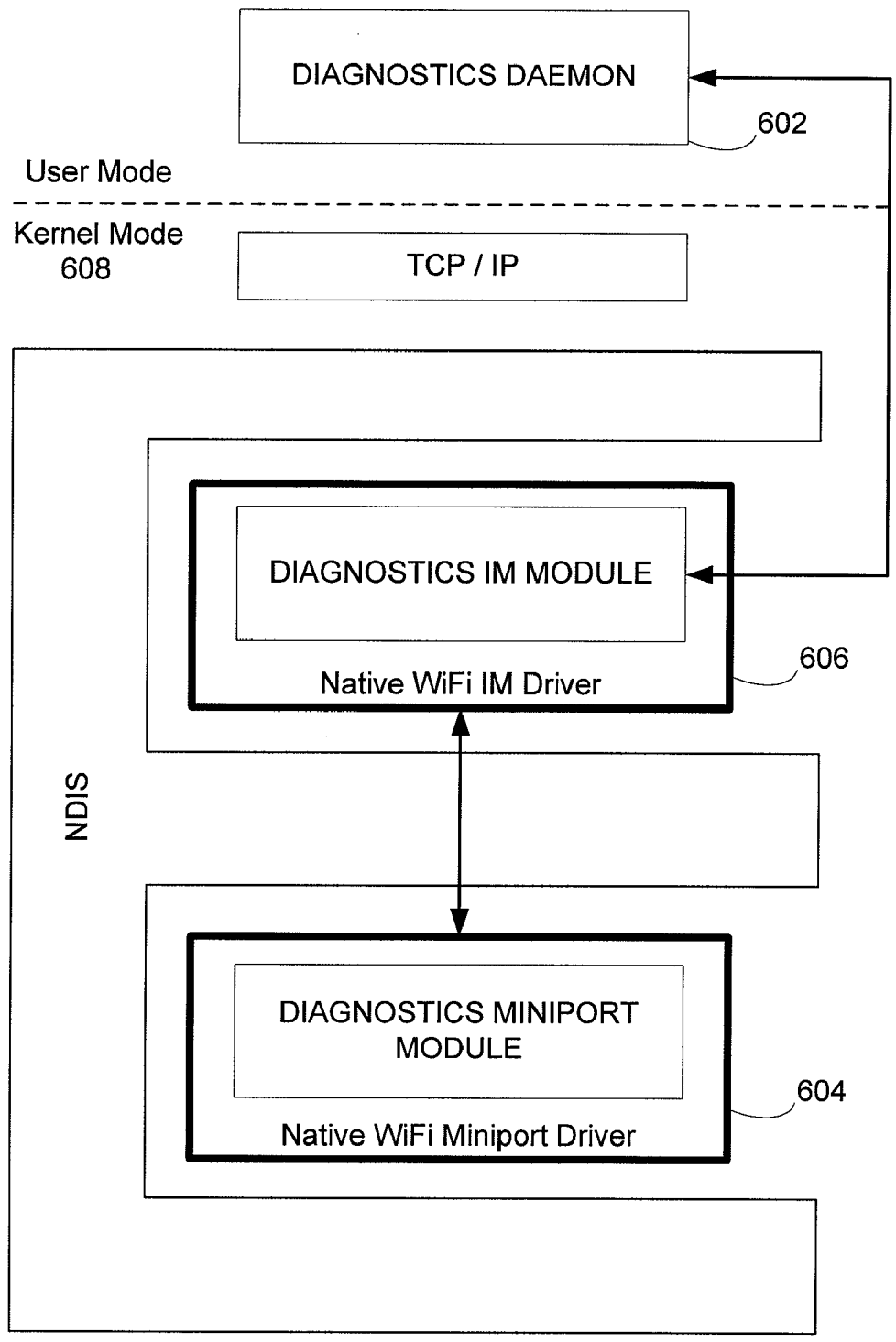
FIG. 6 is a schematic diagram of software components used for locating disconnected clients and rogue access points, in accordance with an embodiment of the invention.
Figure 6:
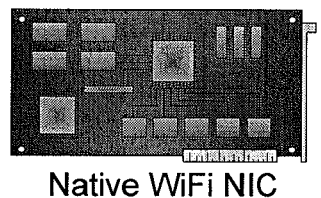

Turning attention to FIG. 6, details of one embodiment of an implementation are shown. The basic architecture consists of the DC, DAP and DS daemons running on clients, access points and servers, respectively. The system can be implemented, for example, on the MICROSOFT WINDOWS operating system with standard commercial 802.11b cards. On the DS, the daemon process accepts information from DAPs. The DS reads the list of legitimate APs from a file or database. The structure of the code on the DC or DAP preferably comprises a user-level daemon 602 and kernel level drivers 604 and 606. These pieces are structured such that code is added to the kernel drivers 604 and 606 only if the functionality cannot be achieved in the user-level daemon 602 or if the performance penalty is too high.

There are two kernel drivers in the exemplary system—a miniport driver 604 and an intermediate driver (IM driver) 606, such as the Native WiFi driver in the MICROSOFT WINDOWS operating system. The miniport driver 604 communicates directly with the hardware and provides basic functionalities such as sending/receiving packets, setting channels, etc. It exposes sufficient interfaces such that functions like association, authentication, etc. can be handled in the IM driver 606. The IM driver 606 supports a number of interfaces (exposed via ioctls) for querying various parameters such as the current channel, transmission level, power management mode, SSID, etc. In addition to allowing the parameters to be set, it allows the user-level code to request for active scans, associate with a particular SSID, capture packets, etc. In general, it provides a significant amount of flexibility and control to the user-level code.

Even though many operations are already present in the IM driver 606, embodiments of the invention used modifications to expose certain functionalities and to improve performance of specific protocols. The miniport driver 604 is preferably changed minimally to expose certain types of packets to the IM driver 606. In the IM driver 606, the following support is preferably added: capturing packet headers and packets; storing the RSSI values from received packets; keeping track of AP information; and kernel event support for protocol efficiency. These modifications are now discussed in further detail.

Capturing packet headers and packets: Embodiments of the invention allow filters to be set such that only certain packets or packet headers are captured, e.g., filters based on specific MAC addresses, packet types, packet subtypes (such as management and beacon packets), etc.

Storing the RSSI values from received packets: Embodiments of the invention obtain the RSSI value of every received packet and maintain a table called the NeighborInfo table that keeps track of the RSSI value from each neighbor (indexed on the MAC address). An exponentially weighted average is maintained with the new value given some weighting factor of, for example, 0.25. The RSSI information is preferably used for estimating the location of disconnected clients and APs using DIAL.

Keeping track of AP information: In the NeighborInfo table, embodiments keep track of the channels on which packets were heard from a particular MAC address, SSID information (from beacons), and whether the device is an AP or a station. This information is preferably sent to the DAP/DS for Rogue AP detection.

Kernel event support for protocol efficiency: An event is preferably added that is shared between the kernel and user-level code. The kernel triggers this event when an "interesting" event occurs; this allows some of the protocols to be interrupt-driven rather being polling based.

Additionally, a number of ioctls are preferably added to get and clear the information discussed above.

In embodiments of the invention, the diagnostics daemon 602 runs on a device and gathers information and implements various mechanisms discussed above, e.g., collect MAC addresses of APs for Rogue AP detection, etc. If the device is an AP, it communicates diagnostic information with the DS and the DCs; if the device is just a DC, it communicates with its associated AP to convey the diagnostic information. The Diagnostic daemon on the DC obtains the current NeighborInfo table from the kernel 608 at a periodic interval, for example every 30 seconds. If any new node has been discovered or if the existing data has changed significantly (e.g., RSSI value of a client has changed by more than a factor of 2), it is sent to the DAP. The DAP also preferably maintains a similar table indexed on MAC addresses. However, it only sends information about disconnected clients and APs to the DS; otherwise, the DS would end up getting updates for every client in the system, making it less scalable. The DAP sends new or changed information about APs to the DS periodically (e.g., 30 seconds). Furthermore, if the DAP has any pending information about a disconnected client D, it informs the DS immediately so that the disconnected can be serviced in a timely fashion. All messages from the DC to the DAP and from DAP to the DS are preferably sent as XML messages. A sample message format from the DC is shown below (timestamps have been removed):

```
<DiagPacket Type="RSSIInfo" TStamp="...">
    <Clients TStamp="...">
        <MacInfo MAC="00:40:96:27:dd:cc" RSSI="23"
            Channels ="19" SSID="" TStamp="..."/>
    </Clients>
    <Real-APs TStamp="...">
        <MacInfo MAC="00:20:a6:4c:c7:85" RSSI="89"
            Channels="12" SSID="UNIV_LAN" TStamp="..."/>
        <MacInfo MAC="00:20:a6:4c:bb:ad" RSSI="7"
            Channels="10" SSID="EXPER" TStamp="..."/>
    </Real-APs>
    <Disconnected-Clients TStamp="...">
        <MacInfo MAC="00:40:96:33:34:3e" RSSI="57"
            Channels="2048" SSID="SOS_764" TStamp="..."/>
    </Disconnected-Clients>
</DiagPacket>
```

As the sample message shows, the DC sends information about other connected clients, APs, and disconnected clients. For each such class of entities, it sends the MAC address of a machine along with RSSI, SSID, and a channel bitmap which indicates the channels on which the particular device was overheard.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for a first wireless client to indicate that it is unable to connect to an infrastructure network, the method comprising acts performed by the first wireless client of:
   attempting to connect to the infrastructure network;
   determining that it is unable to connect to the infrastructure network; and
   broadcasting, in response to determining that it is unable to connect to the infrastructure network, a signal indicating that it is unable to connect to the infrastructure network, wherein multiple other wireless clients in the vicinity of the first wireless client each perform the acts of:
   receiving the signal from the first wireless client;
   recording the signal strength of the received signal from the first wireless client; and
   transmitting the recorded signal strength of the received signal from the first wireless client to a diagnostic server for estimating, by the diagnostic server, the location of the first wireless client.

2. The method of claim 1, wherein the act of determining that the first client is unable to connect to the infrastructure network further comprises an act of determining that it is unable to connect to the infrastructure network by failing to receive any beacon signals transmitted from an access point.

3. The method of claim 1, wherein the act of determining that the first client is unable to connect to the infrastructure network further comprises an act of determining that it is unable to connect to the infrastructure network by failing to receive any probe response signals transmitted from an access point in response to a probe request signal transmitted by the first client.

4. The method of claim 1, wherein the act of broadcasting a signal indicating that the first client is unable to connect to the infrastructure network further comprises an act of broadcasting a beacon signal indicating that the first client is unable to connect to the infrastructure network.

5. The method of claim 1, wherein the infrastructure network operates according to the IEEE 802.11 protocol.

* * * * *